(12) United States Patent
Edwards et al.

(10) Patent No.: US 8,598,759 B2
(45) Date of Patent: Dec. 3, 2013

(54) MAGNETIC GEAR ARRANGEMENT

(75) Inventors: Huw Llewelyn Edwards, Derby (GB); Christopher Graham Bright, Nottingham (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/522,871

(22) PCT Filed: Dec. 21, 2010

(86) PCT No.: PCT/EP2010/070378
§ 371 (c)(1), (2), (4) Date: Sep. 7, 2012

(87) PCT Pub. No.: WO2011/088946
PCT Pub. Date: Jul. 28, 2011

(65) Prior Publication Data
US 2013/0002075 A1    Jan. 3, 2013

(30) Foreign Application Priority Data

Jan. 19, 2010 (GB) ................... 1000780.5
Jan. 21, 2010 (GB) ................... 1000928.0
Nov. 17, 2010 (GB) ................... 1019416.5

(51) Int. Cl.
*H02K 49/10* (2006.01)

(52) U.S. Cl.
USPC ..................... 310/103; 310/156.22

(58) Field of Classification Search
USPC ............ 310/103, 105, 112–114, 179, 156.22, 310/156.28; 464/29–30; 417/420
See application file for complete search history.

(56) References Cited

U.S. PATENT DOCUMENTS

| | | | |
|---|---|---|---|
| 3,085,407 A * | 4/1963 | Tomlinson | 464/29 |
| 4,797,386 A * | 1/1989 | Gyorgy et al. | 505/166 |
| 4,939,120 A * | 7/1990 | Moon et al. | 505/166 |
| 5,071,831 A | 12/1991 | Hilal | |
| 5,130,588 A * | 7/1992 | Armstrong et al. | 505/166 |
| 5,270,601 A * | 12/1993 | Rigney, II | 310/90.5 |
| 5,313,130 A * | 5/1994 | Shibayama et al. | 310/90.5 |
| 5,831,362 A * | 11/1998 | Chu et al. | 310/90.5 |
| 5,947,237 A * | 9/1999 | McMichael et al. | 188/267 |

FOREIGN PATENT DOCUMENTS

GB    2 457 226 A    8/2009

(Continued)

OTHER PUBLICATIONS

Atallah et al., "A high-performance linear magnetic gear," *Journal of Applied Physics*, pp. 10N516-1 to 10N516-3, vol. 97, May 2005.
Atallah et al., "Design, analysis and realisation of a high-performance magnetic gear," *IEE Proc.-Electr. Power Appl.*, pp. 135-143, vol. 151, No. 2, Mar. 2004.

(Continued)

*Primary Examiner* — Tran Nguyen
(74) *Attorney, Agent, or Firm* — Oliff & Berridge, PLC

(57) ABSTRACT

A magnetic gear arrangement includes: a first gear member for generating a first magnetic field, a second gear member for generating a second magnetic field, and a coupling device which provides an arrangement of interpoles between the first gear member and the second gear member. The interpoles couple the first and second magnetic fields to produce a gearing between the first and second gear members. The first gear member has superconducting magnets or coils for generating the first magnetic field and/or the second gear member has superconducting magnets or coils for generating the second magnetic field.

15 Claims, 12 Drawing Sheets

(56) References Cited

FOREIGN PATENT DOCUMENTS

| | | |
|---|---|---|
| GB | 2 457 682 A | 8/2009 |
| JP | A-62-147949 | 7/1987 |
| JP | A-63-245247 | 10/1988 |
| JP | A-64-026361 | 1/1989 |
| JP | A-01-138962 | 5/1989 |
| JP | A-05-049233 | 2/1993 |
| JP | A-2001-339935 | 12/2001 |
| WO | WO 2007/107691 A1 | 9/2007 |
| WO | WO 2007/135360 A1 | 11/2007 |
| WO | WO 2010/015299 A1 | 2/2010 |
| WO | WO 2010/017860 A1 | 2/2010 |

OTHER PUBLICATIONS

May 25, 2011 International Search Report issued in International Patent Application No. PCT/EP2010/070378.
May 25, 2011 Written Opinion issued in International Patent Application No. PCT/EP2010/070378.
May 24, 2011 International Search Report issued in International Patent Application No. PCT/EP2010/070375.
May 24, 2011 International Search Report issued in International Patent Application No. PCT/EP2010/070376.
May 19, 2010 Search Report issued in British Application No. GB1000928.0.
May 6, 2010 Search Report issued in British Application No. GB1000780.5.

* cited by examiner

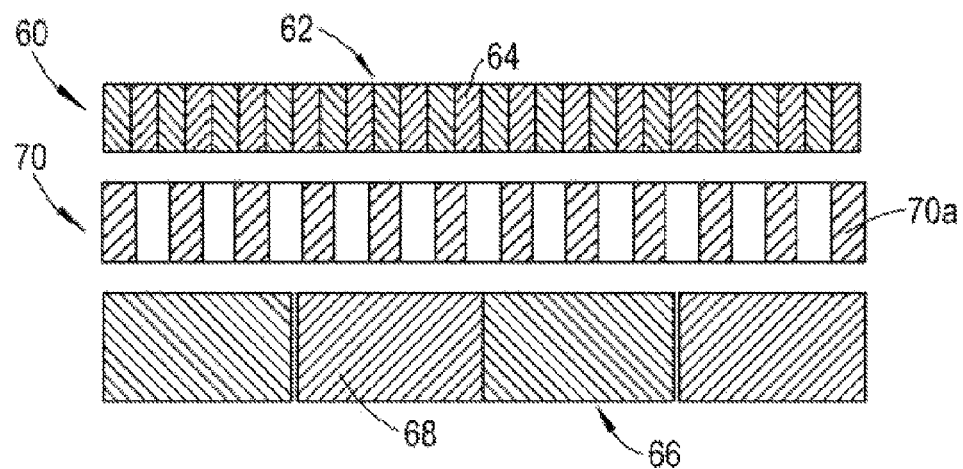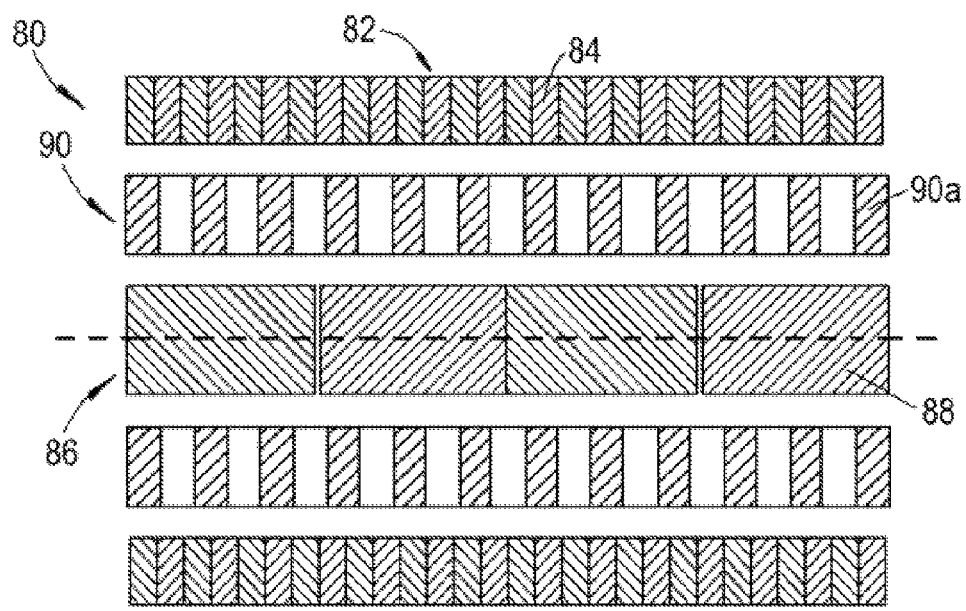

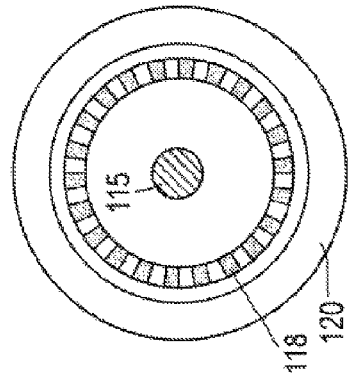
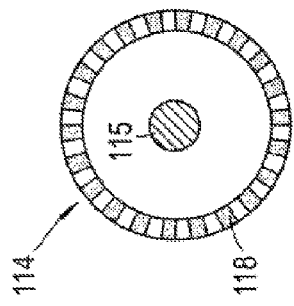
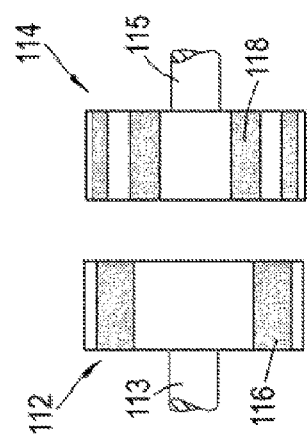
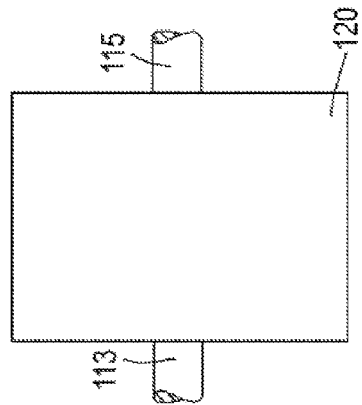
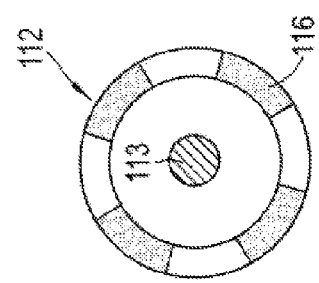
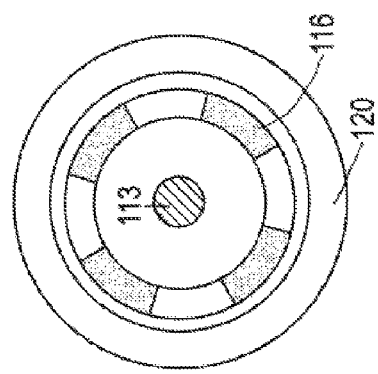

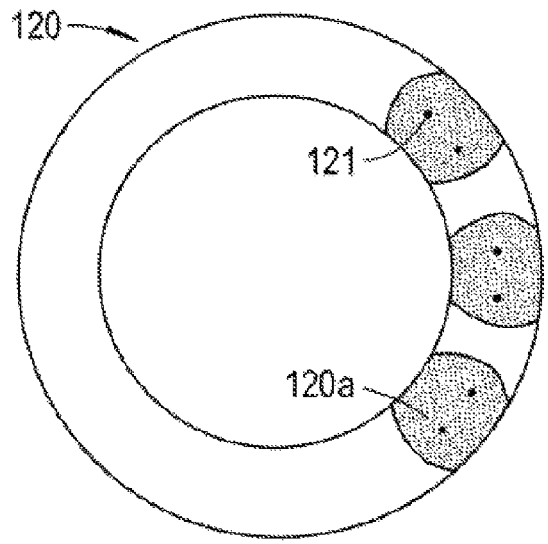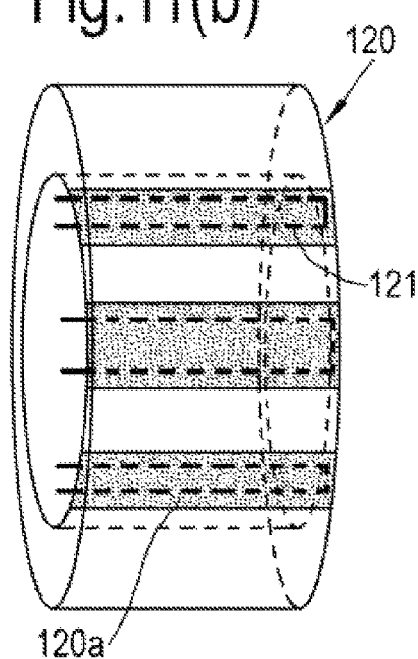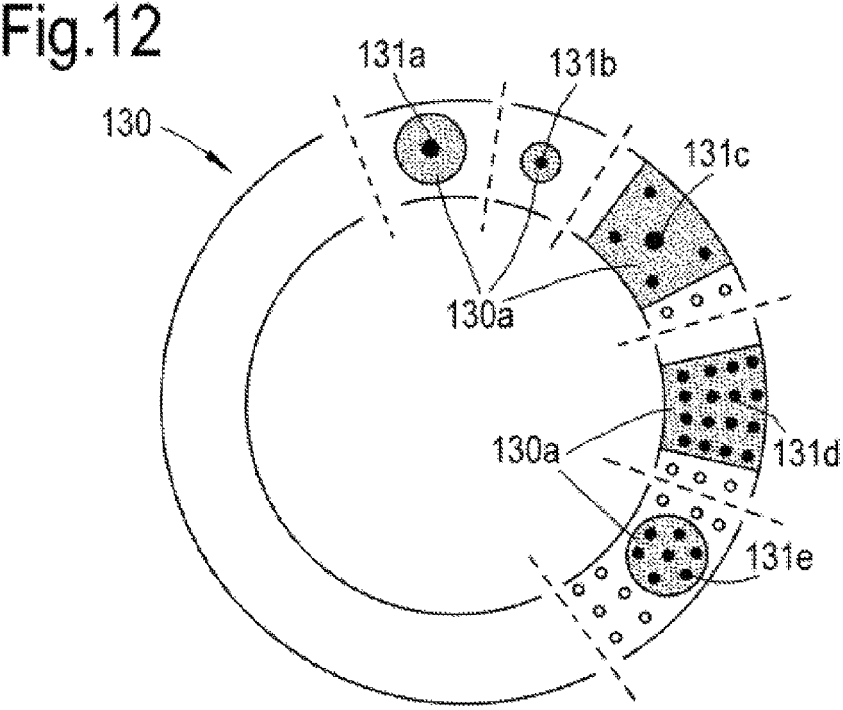

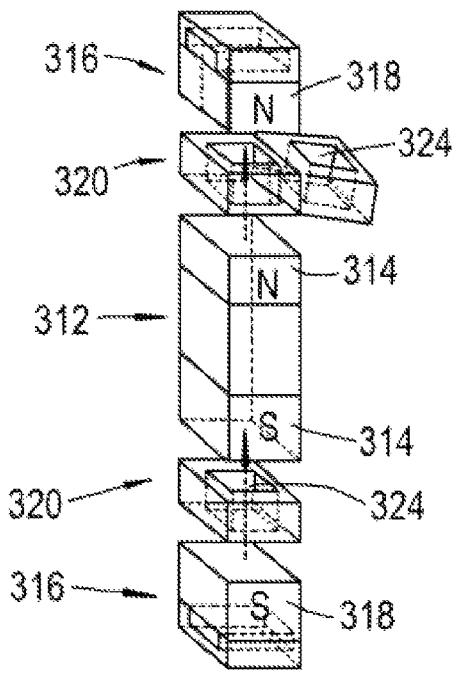
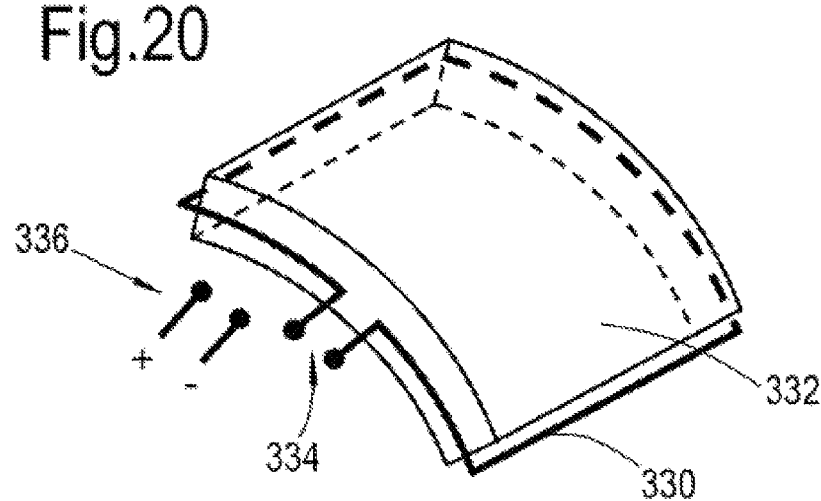

MAGNETIC GEAR ARRANGEMENT

FIELD OF THE INVENTION

The present invention relates to magnetic gear arrangements, and for example to magnetic gear arrangements having a variable gear ratio.

BACKGROUND OF THE INVENTION

Gearboxes and gear arrangements are utilised in a wide range of situations in order to couple drive mechanisms. Traditionally, gearboxes have been formed from gear wheels having appropriate teeth numbers and sizes to provide a desired gear ratio. However, such gearboxes have a number of disadvantages. Firstly, they require the use of lubricating oils, which may act as contaminants or fire hazards and may prove ineffective in hot or cold environments, where the oil viscosity varies, or in a low pressure environment, where the oil may evaporate. Furthermore, gearboxes based on gear wheels may be noisy, making them unacceptable for low noise environments such as in hospitals, libraries and residential areas, or for clandestine military activities.

More recently, magnetic gearboxes have been provided which comprise respective gear rotors with interpoles between them. The rotors incorporate permanent magnets, and the interpoles act to modulate the magnetic flux transferred between the gear rotors. Such magnetic gearboxes enable a speed-changing mechanical device to be provided in which there is no mechanical contact between input and output shafts, thus avoiding many of the problems of noise and wear that arise in gearboxes having contacting moving parts.

FIG. 1 shows a schematic cross-sectional view of a magnetic gear arrangement of the prior art. The magnetic gear arrangement 600 is an epicyclic gearbox and comprises an inner rotor 602 and an outer rotor 606. Permanent magnets providing respective pole pairs 604, 608 are fixed to the inner and outer rotors 602, 606, the opposite polarities of each permanent magnet being respectively indicated by dark and light shading. The permanent magnets affixed to the inner rotor 602 have alternating polarity along the circumference of the rotor. Similarly, the permanent magnets affixed to the outer rotor 606 have alternating polarity along the circumference of that rotor. Typically, one rotor is mechanically coupled to a drive mechanism and the other rotor is mechanically coupled to a driven mechanism.

The inner and outer rotors 602, 606 have different numbers of pole pairs 604, 608. Typically, the number of pole pairs of the outer rotor 606 is greater than the number of pole pairs of the inner rotor 602.

Pole elements 610 are provided between the inner rotor 602 and the outer rotor 606 and form an array to provide a coupling element having a cylindrical shape.

Each pole element 610 forms one interpole for modulating the magnetic fields produced by the inner rotor 602 and the outer rotor 606, so as to couple the two fields and hence the motion of the rotors. The angular position of the interpoles is a factor in determining the gearing of the magnetic gearbox.

The motion of the rotors 602, 606 may be either co-rotational or counter-rotational, depending on the number of magnets affixed to each rotor and the angular position/number of interpoles.

WO 2007/135360 discusses a variety of magnetic gear arrangements.

SUMMARY OF THE INVENTION

A problem arises, however, of assembling the permanent magnets into such gear arrangements due to the strong magnetic fields between magnetised components.

Accordingly, a first aspect of the invention provides a magnetic gear arrangement comprising:
- a first gear member for generating a first magnetic field,
- a second gear member for generating a second magnetic field, and
- a coupling device which provides an arrangement of interpoles between the first gear member and the second gear member, the interpoles coupling the first and second magnetic fields to produce a gearing between the first and second gear members;
- wherein the first gear member has superconducting magnets or coils for generating the first magnetic field and/or the second gear member has superconducting magnets or coils for generating the second magnetic field.

By generating the first and/or the second magnetic field using superconducting magnets or coils, the problem of assembling permanent magnets can be avoided. That is, superconducting magnets can be magnetised in situ after assembly, e.g. by flux pumping. Likewise, superconducting coils can be energised in situ. Superconducting magnets or coils can also produce higher flux densities than ferromagnets.

The magnetic gear arrangement of the first aspect may have any one or, to the extent that they are compatible, any combination of the following optional features.

Typically both the first and the second gear members have superconducting magnets or coils.

Preferably, superconducting magnets generate the magnetic field(s).

Preferably, the magnetic gear arrangement further comprises electrical windings for flux pumping the superconducting magnets or coils. The windings can, for example, wind around the superconducting magnets. Another option is for the windings to be located in a gap between the respective gear member and the coupling device. In such an arrangement, the windings do not have to move with the gear member, which can reduce the forces on the windings. Yet another option is for the windings to be carried by the coupling device.

The magnetic gear arrangement may further comprise a housing for the first and second gear members and the coupling device, the housing being formed of a superconducting material. The housing can then contain the very strong magnetic fields which may be generated by the superconducting magnets or coils.

Conveniently, the coupling device can comprise superconducting material which defines the interpole arrangement. The magnetic gear arrangement may then further comprise a heater for heating the coupling device. This allows the coupling device to be heated above the critical temperature of its superconducting material to remove unwanted magnetisation from the superconducting material, e.g. caused by the flux pumping of superconducting magnets.

Indeed, a second aspect of the present invention provides a magnetic gear arrangement comprising:
- a first gear member for generating a first magnetic field,
- a second gear member for generating a second magnetic field, and
- a coupling device which provides an arrangement of interpoles between the first gear member and the second gear member, the interpoles coupling the first and second magnetic fields to produce a gearing between the first and second gear members;
- wherein the coupling device comprises superconducting material which defines the interpole arrangement. Again, the magnetic gear arrangement may further comprise a heater for heating the coupling device.

The magnetic gear arrangement of the second aspect, or the magnetic gear arrangement of the first aspect in which the coupling device comprises superconducting material which defines the interpole arrangement, may have any one or, to the extent that they are compatible, any combination of the following optional features.

The coupling device may comprises a superconducting body having a plurality of spaced openings therein, the openings forming the interpoles, and the superconducting material providing regions between neighbouring interpoles which regions are relatively impermeable to the first and second magnetic fields. Thus the magnetic fields generated by the gear members can be repelled by the relatively impermeable regions due to the Meissner effect, and pass through the relatively permeable openings.

The openings may be filled to increase the mechanical strength of the coupling device. In order to reduce eddy currents and magnetic hysterisis losses, the openings may be filled with electrically insulating material. Alternatively, or additionally, in order to enhance the magnetic permeability of the interpoles, the openings may be filled with ferromagnetic pole elements. Such pole elements may be laminated to reduce eddy currents.

The magnetic gear arrangement may further comprise a separator element between the first gear member and the second gear member, the separator element being formed of a superconducting material, wherein the separator element prevents or discourages magnetic flux extending between the first and second gear members but bypassing the coupling device.

The magnetic gear arrangement may further comprise a housing for the first and second gear members and the coupling device, the housing being formed of a superconducting material.

It is desirable to provide gearboxes in which the number and/or spacing of interpoles, or the torque transmission capability of the coupling element is adjustable. In this respect, a coupling device comprising superconducting material which defines the interpole arrangement can be particularly advantageous when different arrangements of interpoles are needed to produce different gearings between the first and second gear members.

Thus, in general terms, third and fourth aspects of the present invention provide a magnetic gear arrangement in which the number and/or torque carrying capacity of interpoles may be adjusted by varying the temperature of the elements that provide the interpoles.

In particular, the third aspect of the present invention provides a magnetic gear arrangement comprising:
a first gear member for generating a first magnetic field,
a second gear member for generating a second magnetic field, and
a coupling device which provides arrangements of interpoles between the first gear member and the second gear member, the interpoles coupling the first and second magnetic fields such that different arrangements of interpoles produce different gearings between the first and second gear members;
wherein the coupling device comprises a plurality of superconducting pole elements which at least partly form the interpoles, each pole element having a critical temperature whereby the pole element is active in a respective interpole above its critical temperature and inactive below its critical temperature. By a "different gearing" is meant a different gear ratio between the first and second gear member and/or a different direction of relative movement between the first and second gear member.

By a "different arrangement of interpoles" is meant a different number and/or distribution of interpoles in the coupling device, including the possibility that when the temperatures of the pole elements cross their respective critical temperatures, no interpoles are provided, such that the first and second gear members are decoupled.

Above the critical temperature, the pole elements are permeable to magnetic fields and are thus able to participate in coupling the magnetic flux of the first and second magnetic fields. Below the critical temperature, however, the Meissner effect causes the pole elements to repel surrounding magnetic fields. Thus simply varying the temperature of the pole elements can change the type and/or extent of coupling between the first and second gear members.

Advantageously, the coupling device can avoid using iron-based interpoles, and therefore avoid the consequent problems of magnetic saturation associated with ferromagnetic materials (typically of around 2T). The coupling device may thus be compatible with higher flux density superconducting fields, which can lead to an improved torque carrying capacity in the arrangement.

Although presented as a separate aspect, the magnetic gear arrangement of the third aspect may be: a magnetic gear arrangement of the first or second aspect in which the coupling device provides arrangements of interpoles between the first gear member and the second gear member, the interpoles coupling the first and second magnetic fields such that different arrangements of interpoles produce different gearings between the first and second gear members; and wherein the coupling device comprises a plurality of superconducting pole elements which at least partly form the interpoles, each pole element having a critical temperature whereby the pole element is active in a respective interpole above its critical temperature and inactive below its critical temperature.

The magnetic gear arrangement of the third aspect may have any one or, to the extent that they are compatible, any combination of the following optional features.

Preferably, the first gear member has superconducting magnets or coils for generating the first magnetic field and the second gear member has superconducting magnets or coils for generating the second magnetic field. Superconducting magnets or coils can produce higher flux densities than ferromagnets. In addition, gear members with superconducting magnets may be easier to manufacture than gear members with ferromagnets, since the superconducting magnets can be magnetised in situ, e.g. using flux pumping. However, the magnetic fields of the first and second gear members could be generated by ferromagnets or electrical windings.

Preferably, deactivating at least a portion of the pole elements provides a different arrangement of interpoles. In this way, a different gearing between the first and second gear members can be produced.

Deactivating at least a portion of the pole elements typically reduces the magnetic permeabilities of the respective interpoles to reduce the torque transmission capability of the coupling device. However, when pole elements are deactivated, the arrangement of interpoles, and thus the gearing, can remain unchanged. In this way, different torque limits can be placed on the same interpole arrangement.

Preferably a first portion of the pole elements has a first critical temperature, and another portion of the pole elements has a lower, second critical temperature. Providing a gear arrangement in which the coupling element comprises a plurality of superconducting pole elements having different critical temperatures can enable simpler temperature control strategies to provide different arrangements of interpoles.

For example, at temperatures above the first and second critical temperatures, all the pole elements of both portions can be permeable to magnetic flux. Therefore all the pole elements can be active and able to contribute to the coupling of the first and second magnetic fields. Thus, the coupling device provides a first, high-temperature interpole arrangement.

At temperatures between the temperatures of the first and second critical temperatures, the pole elements of the second portion are active as they have a lower critical temperature than the temperature of the coupling device. In contrast, the pole elements of the first portion are in a superconducting state, i.e. they are not able to contribute to the coupling of the first and second magnetic fields. Therefore, at temperatures between the first and second critical temperatures, the coupling device comprises some active pole elements and some inactive pole elements. Thus, the coupling device provides a second, intermediate-temperature interpole arrangement.

The change from the first to the second interpole arrangement, or vice versa, can be effected simply by lowering or raising the temperature of the entire coupling device.

The magnetic gear arrangement can be configured such that a change from a first, high-temperature interpole arrangement to a second, intermediate-temperature interpole arrangement results in a reversal of the direction of rotation of the second gear member relative to the first gear member. Thus, for example, the gear arrangement may function as a co-rotational gear arrangement at high temperatures (above the first and second critical temperatures) and as a counter-rotational gear arrangement at intermediate temperatures (between the first and second critical temperatures). Alternatively, the gear arrangement may provide a counter-rotational gear at high temperatures and a co-rotational gear at intermediate temperatures. However, in other embodiments, both gears may be co-rotational, or both gears may be counter-rotational.

At temperatures below both the first and second critical temperatures, all the pole elements of the first and second portions are in a superconducting state and are therefore inactive. When no active pole elements are available to provide interpoles for coupling the first and second magnetic fields, the coupling device can no longer transfer power between the first and second gear members.

The magnetic gear arrangement may be configured such that at temperatures above the first and second critical temperatures, when all pole elements of the first and second portions in the coupling device are active, each pole element forms a single interpole. In this case, the number of interpoles will decrease as the temperature is reduced below the first critical temperature and certain pole elements become inactive. The gear arrangement will typically exhibit counter-rotating motion of the first and second gear members at high temperatures (i.e. above the first and second critical temperatures) and co-rotating motion of the first and second gear members at intermediate temperatures (i.e. between the first and second critical temperatures).

Alternatively, the magnetic gear arrangement may be configured such that at least one interpole in an arrangement of interpoles may be formed by a group of neighbouring active pole elements. That is, the coupling device may include a plurality of neighbouring pole elements that are sufficiently close together such that at temperatures above the first and second critical temperatures, i.e. when all the pole elements of the first and second portions are active, the plurality of neighbouring pole elements provides a single interpole for the purposes of determining the gear ratio between the first and second gear members.

Preferably, the interpoles are formed entirely from superconducting pole elements. In this way, reducing the temperature of the coupling device below the lowest critical temperature of the pole elements prevents the coupling device from transmitting torque between the first and the second gear members. That is, the gear arrangement can have a clutch functionality.

The coupling device may further comprise joining portions which join together neighbouring pole elements, the joining portions being formed of a superconducting material having a higher critical temperature than the highest critical temperature of the pole elements. To encourage magnetic flux to follow a path through active pole elements, regions between pole elements which do not form interpoles should have low magnetic permeabilities. The joining portions, being formed of a superconducting material having a higher critical temperature than the highest critical temperature of the pole elements, can be maintained in a superconducting state during normal operation of the gear arrangement, and thus can repel magnetic flux away from the joining portions and into the interpoles.

Indeed, the pole elements may be encased in a superconducting material having a higher critical temperature than the highest critical temperature of the pole elements, the encasing superconducting material having openings therein to allow magnetic flux to reach the interpoles from the first and second gear members. By encasing the pole elements in this way, all magnetic flux passing through the coupling device can be channelled through the interpoles.

The magnetic gear arrangement may further comprise a separator element between the first gear member and the second gear member, the separator element being formed of a superconducting material having a higher critical temperature than the highest critical temperature of the pole elements, wherein the separator element prevents or discourages magnetic flux extending between the first and second gear members but bypassing the coupling device.

The magnetic gear arrangement may further comprise a housing for the first and second gear members and the coupling device, the housing being formed of a superconducting material having a higher critical temperature than the highest critical temperature of the pole elements. Such an arrangement may be particularly advantageous if the gear members have superconducting magnets or coils. The housing can then contain the very strong magnetic field which may be produced by the magnets.

Preferably, the magnetic gear arrangement further comprises a temperature controller for controlling the temperature of at least some of the superconducting pole elements such that, under the control of the temperature controller, the temperatures of pole elements can cross their respective critical temperatures and thereby change from active to inactive or the reverse.

For example, the temperature controller and coupling device may be configured such that the temperature controller varies the temperatures of all the superconducting pole elements of the coupling device, all the pole elements having substantially the same temperature.

Alternatively, the temperature controller and coupling device may be configured such that the temperature controller varies the temperatures of only a selected portion of the pole elements of the coupling device, and a temperature differential can be maintained between pole elements of the coupling device.

The temperature controller may include heating and/or cooling elements for actively controlling the temperature of the whole or portions of the coupling device, e.g. to speed up temperature changes. The temperature controller may comprises heating elements, such as resistance heating elements, for heating a portion of the pole elements, while other pole elements are unheated. The coupling device can be configured such that a temperature differential can be maintained between the heated and unheated pole elements. Even if both portions of pole elements have the same critical temperature, unheated pole elements can thus be cooled below their critical temperatures to make them inactive, while heated pole elements can be held above their critical temperatures and made active. By applying suitable temperature control, the gear arrangement can thus provide interpole arrangements similar to those discussed above in relation to a coupling device having a first portion of pole elements with a first critical temperature, and another portion of the pole elements with a lower, second critical temperature. That is, the unheated pole elements can correspond to the first portion and the heated pole elements can correspond to the second portion.

The action of the temperature controller may itself be determined by the operating condition of the first and/or second gear member. For example, the magnetic gear arrangement may further comprise a sensor for detecting the operating condition of the first and/or second gear member and communicating the operating condition to the temperature controller. The sensor may detect the speed of the first and/or second gear members, and/or the torque transmitted by them. The data gathered by the sensor can then be used to activate the temperature controller when a predetermined operational condition of the gear arrangement is attained.

The fourth aspect of the present invention provides a magnetic gear arrangement comprising:
  a first gear member for generating a first magnetic field,
  a second gear member for generating a second magnetic field, and
  a coupling device which provides arrangements of interpoles between the first gear member and the second gear member, the interpoles coupling the first and second magnetic fields such that different arrangements of interpoles produce different gearings between the first and second gear members;
  wherein the coupling device comprises a superconducting body having a critical temperature and further comprises a plurality of temperature control elements for heating respective regions of the superconducting body, such that when heated above the critical temperature each region becomes active to at least partly form a respective interpole, and when cooled below the critical temperature each region becomes inactive. By a "different gearing" is meant a different gearing ratio between the first and second gear member and/or a different direction of relative movement between the first and second gear member. By a "different arrangement of interpoles" is meant a different number and/or distribution of interpoles in the coupling device, including the possibility that when the regions become inactive, no interpoles are provided, such that the first and second gear members are decoupled.

Above the critical temperature, the regions are permeable to magnetic fields and are thus able to participate in coupling the magnetic flux of the first and second magnetic fields. Below the critical temperature, however, the Meissner effect causes the regions to repel surrounding magnetic fields. Thus simply varying the temperatures of the regions can change the type and/or extent of coupling between the first and second gear members.

Advantageously, the coupling device can avoid using iron-based interpoles, and therefore avoid the consequent problems of magnetic saturation associated with ferromagnetic materials (typically of around 2T). The coupling device may thus be compatible with higher flux density superconducting fields, which can lead to an improved torque carrying capacity in the arrangement.

Although presented as a separate aspect, the magnetic gear arrangement of the fourth aspect may be: a magnetic gear arrangement of the first or second aspect in which the coupling device provides arrangements of interpoles between the first gear member and the second gear member, the interpoles coupling the first and second magnetic fields such that different arrangements of interpoles produce different gearings between the first and second gear members; and wherein the coupling device comprises a superconducting body having a critical temperature and further comprises a plurality of temperature control elements for heating respective regions of the superconducting body, such that when heated above the critical temperature each region becomes active to at least partly form a respective interpole, and when cooled below the critical temperature each region becomes inactive.

The magnetic gear arrangement of the fourth aspect may have any one or, to the extent that they are compatible, any combination of the following optional features.

The temperature control elements may be electrical resistance heating elements. However, non electrical heating elements may also be possible. For example, the heating elements may be thermally conductive members extending through the superconducting body, the thermally conductive members extending to a source of heat. Alternatively, the superconducting body could be cooled by coolant passages extending through the body, and the temperature control elements may be passive elements such as valves which can be controlled to prevent the flow of coolant to selected passages, thereby forming heated regions in the superconducting material surrounding those passages. The coupling device may have thermally insulating elements which reduce the flow of heat from the heated regions to the rest of the superconducting body.

The first gear member may have ferromagnets, superconducting magnets, or coils (superconducting or otherwise) for generating the first magnetic field. Likewise, the second gear member may have ferromagnets, superconducting magnets, or coils (superconducting or otherwise) for generating the second magnetic field. Preferably, however, the first gear member has superconducting magnets or coils for generating the first magnetic field and the second gear member has superconducting magnets or coils for generating the second magnetic field. Superconducting magnets or coils can produce higher flux densities than ferromagnets or non-superconducting coils. In addition, gear members with superconducting magnets may be easier to manufacture than gear members with ferromagnets, since the superconducting magnets can be magnetised in situ, e.g. using flux pumping. However, the magnetic fields of the first and second gear members could be generated by ferromagnets or electrical windings.

Preferably, activating different arrangements of regions provides different arrangements of interpoles. In this way, a different gearing between the first and second gear members can be produced.

Deactivating at least some of the regions, or partially deactivating at least some of the regions, typically reduces the magnetically permeable cross-sectional areas of the respective interpoles to reduce the torque transmission capability of the coupling device. However, when regions are deactivated, the arrangement of interpoles, and thus the gear ratio, can remain unchanged. In this way, different torque limits can be placed on the same interpole arrangement.

For example, a first arrangement of interpoles can be provided by heating a first set of regions above the critical temperature, and hence activating those regions. A second set of regions are not heated and are therefore inactive. Thus only the first set of regions forms interpoles. However, a second arrangement of interpoles can be provided by also heating the second set of regions above the critical temperature. Both sets of regions are then activated to form the second arrangement. The change from the first to the second interpole arrangement, or vice versa, can be effected simply by heating different regions of the superconducting body. The magnetic gear arrangement can be configured such that a change from a first interpole arrangement to a second interpole arrangement results in a reversal of the direction of rotation of the second gear member relative to the first gear member. However, in other embodiments, both interpole arrangements provide co-rotational gear members, or both interpole arrangements may provide counter-rotational gear members.

When none of the regions are heated, all the regions are in a superconducting state and are therefore inactive. If no active regions are available to provide interpoles for coupling the first and second magnetic fields, the coupling device can no longer transfer power between the first and second gear members.

The magnetic gear arrangement may be configured such that each heated region forms a single interpole. In this case, the number of interpoles will decrease when regions are cooled below the critical temperature. The gear arrangement will typically exhibit counter-rotating motion of the first and second gear members in the second arrangement of interpoles when both sets of regions are heated, and co-rotating motion of the first and second gear members in the first arrangement of interpoles when only one set of regions is heated.

Alternatively, the magnetic gear arrangement may be configured such that at least one interpole in an arrangement of interpoles may be formed by a group of neighbouring active regions. That is, the coupling device may include a plurality of neighbouring regions that are sufficiently close together such that when they are all active, they provide a single interpole for the purposes of determining the gear ratio between the first and second gear members.

Preferably, the interpoles are formed entirely by the regions. In this way, cooling the regions below the critical temperature prevents the coupling device from transmitting torque between the first and the second gear members. That is, the gear arrangement can have a clutch functionality.

The magnetic gear arrangement may further comprise a separator element between the first gear member and the second gear member, the separator element being formed of a superconducting material, wherein the separator element prevents or discourages magnetic flux extending between the first and second gear members but bypassing the coupling device. Preferably, the critical temperature of the separator element is equal to or greater than the critical temperature of the superconducting body, so that when the separator element and the body are cooled to the same temperature below the critical temperature of the body they can both be in a superconducting state.

The magnetic gear arrangement may further comprise a housing for the first and second gear members and the coupling device, the housing being formed of a superconducting material. Preferably, the critical temperature of the housing is equal to or greater than the critical temperature of the superconducting body, so that when the housing and the body are cooled to the same temperature below the critical temperature of the body they can both be in a superconducting state. Such an arrangement may be particularly advantageous if the gear members have superconducting magnets or coils. The housing can then contain the very strong magnetic field which may be produced by the magnets.

Preferably, the magnetic gear arrangement further comprises a temperature controller for controlling the temperature of at least some of the heated regions such that, under the control of the temperature controller, the temperatures of heated regions can cross their respective critical temperatures and thereby change from active to inactive or the reverse.

For example, the temperature controller and coupling device may be configured such that the temperature controller varies the temperatures of all the heated regions of the coupling device, all the heated regions having substantially the same temperature. Alternatively, the temperature controller and coupling device may be configured such that the temperature controller varies the temperatures of only a selected portion of the heated regions.

The action of the temperature controller may itself be determined by the operating condition of the first and/or second gear member. For example, the magnetic gear arrangement may further comprise a sensor for detecting the operating condition of the first and/or second gear member and communicating the operating condition to the temperature controller. The sensor may detect the speed of the first and/or second gear members, and/or the torque transmitted by them. The data gathered by the sensor can then be used to activate the temperature controller when a predetermined operational condition of the gear arrangement is attained.

Typically, the magnetic gear arrangement further comprises a cooling system for the superconducting body of the coupling device. If the magnets or coils on the gear members are non-superconducting, the cooling system may only need to cool the coupling device itself. However, if the gear members have superconducting magnets or coils, then the cooling system preferably cools the gear members as well. The cooling system may then require seals for mechanical couplings to the gear members to enter the cooled region.

In the magnetic gear arrangement of any of the above aspects, the first and the second gear members typically move relative to each during operation of the gear arrangement, and the coupling device is stationary. However, some arrangements may be configured so that the coupling device moves relative to one of the gear members during operation of the gear arrangement, and the other gear member is stationary. Alternatively both gear members and the coupling device could be free to move.

In the magnetic gear arrangement of any of the above aspects, the first and second gear members typically have respective mechanical couplings. These couplings may connect a drive mechanism and a driven mechanism.

The magnetic gear arrangement of any of the above aspects may be an inline gear arrangement, an epicyclic gear arrangement, or may have a different configuration. The gear members may be rotors or linear gear members.

A fifth aspect of the present invention provides a method of operating a magnetic gear arrangement, the method comprising:
  providing a magnetic gear arrangement according to the third aspect; and
  controlling the temperature of at least some of the pole elements such that the temperatures of pole elements cross their respective critical temperatures, and thereby change from active to inactive or the reverse.

The magnetic gear arrangement of the method of the fifth aspect may have any one or, to the extent that they are compatible, any combination of the optional features of the magnetic gear arrangement of the third aspect.

A sixth aspect of the present invention provides a method of operating a magnetic gear arrangement, the method comprising:

providing a magnetic gear arrangement according to the fourth aspect; and controlling the temperature of at least some of the heated regions such that the temperatures of heated regions cross their respective critical temperatures, and thereby change from active to inactive or the reverse.

The magnetic gear arrangement of the method of the sixth aspect may have any one or, to the extent that they are compatible, any combination of the optional features of the magnetic gear arrangement of the fourth aspect.

The magnetic gear arrangement of the first aspect can be an example of a more general magnetic gear arrangement than that of the third or fourth aspect. Thus, the magnetic gear arrangement of the first aspect is either (a) a magnetic gear arrangement according to the third or fourth aspect, or (b) a magnetic gear arrangement which is other than a magnetic gear arrangement of the third or fourth aspect.

Likewise, the magnetic gear arrangement of the second aspect can be an example of a more general magnetic gear arrangement than that of the third or fourth aspect. Thus, the magnetic gear arrangement of the second aspect is either (a) a magnetic gear arrangement according to the third or fourth aspect, or (b) a magnetic gear arrangement which is other than a magnetic gear arrangement of the third or fourth aspect.

BRIEF DESCRIPTION OF THE DRAWINGS

Embodiments of the invention will now be described by way of example with reference to the accompanying drawings in which:

FIG. 7 shows schematically a linear gear arrangement;

FIG. 8 shows schematically a further linear gear arrangement;

FIG. 9 shows schematically a magnetic in-line gearbox without its cylindrical coupling device in place in (a) an end-on view of a first rotor of the gearbox, (b) an end-on view of a second rotor of the gearbox, and (c) a side view;

FIG. 10 shows schematically the gearbox of FIG. 9 with the coupling device in place in (a) an end-on view of the first rotor and the coupling device, (b) an end-on of the second rotor and the coupling device, and (c) a side view;

FIG. 11 shows schematically (a) an end view, and (b) a side view of the coupling device of FIG. 10;

FIG. 12 shows schematically a cross-sectional view through a further cylindrical coupling device;

FIG. 19 shows schematically the alignment of magnetised regions on the rotors of the magnetic gear arrangement of FIG. 17 align with the slots in the superconducting cylinder coupling device;

FIG. 20 shows schematically a flux pumping winding located on a superconducting magnet of a rotor of the magnetic gear arrangement of FIG. 17;

DETAILED DESCRIPTION

Coupling Devices Comprising a Plurality of Superconducting Pole Elements

Figure 2:
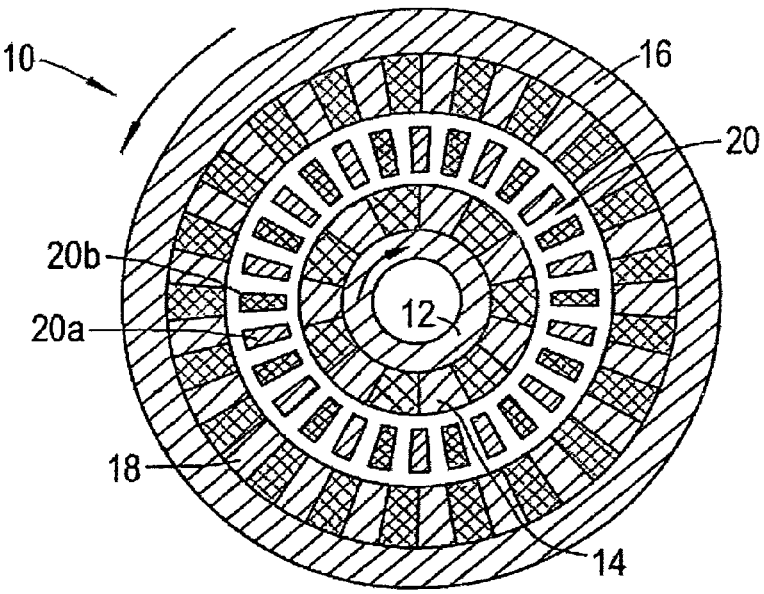
FIG. 2 shows a schematic cross-sectional view of a magnetic gear arrangement according to an embodiment of the present invention.

FIG. 2 shows a schematic cross-sectional view of a magnetic gear arrangement according to an embodiment of the present invention. The magnetic gear arrangement is in the form of an epicyclic gearbox 10 and comprises an inner rotor 12 (i.e. a first gear member) and an outer rotor 16 (i.e. a second gear member). Superconducting permanent magnets fixed to the inner and outer rotors provide respective pole pairs 14, 18, the opposite polarities of each magnet being respectively indicated by dark and light shading. The magnets affixed to the inner rotor have alternating polarity along the circumference of the rotor. Similarly, the magnets affixed to the outer rotor have alternating polarity along the circumference of that rotor. Typically, one rotor is mechanically coupled to a drive mechanism and the other rotor is mechanically coupled to a driven mechanism.

The inner and outer rotors 12, 16 have different numbers of magnets. In the embodiment of FIG. 2, the outer rotor is shown with 21 pole pairs, and inner rotor is shown with seven pole pairs.

Pole elements 20a, 20b formed of superconducting material are provided between the inner rotor 12 and the outer rotor 16, and form an array having a cylindrical shape. Active pole elements (i.e. pole elements whose temperature lies above their critical temperature) form interpoles that modulate the magnetic fields produced by the inner rotor 12 and the outer rotor 16, so as to couple the two fields and hence couple the motion of the rotors. The number and distribution of interpoles is a factor in controlling the gearing of the gearbox.

Effectively, the pole elements are part of a coupling device 20 that provides arrangements of interpoles for coupling the magnetic fields produced by the inner and outer rotors 12, 16.

In the embodiment of FIG. 2, each active pole element forms a single interpole of the coupling element.

A first set of the pole elements 20a has a higher critical temperature for superconductivity than a second set of the pole elements 20b. In the embodiment of FIG. 2, there are 28 pole elements, half having the higher critical temperature and half having the lower critical temperature, in a circumferential arrangement with alternating critical temperature. At its critical temperature, the superconducting material of a pole element changes its behaviour from being permeable to magnetic fields and thus active in coupling the magnetic flux produced by the pole pairs 14, 18, to repelling magnetic fields due to the Meissner effect and thus inactive in coupling the magnetic flux. Because of the different critical temperatures, this change from active to inactive status occurs at different temperatures for the two sets of pole elements 20a, 20b.

When the gearbox 10 is operated at temperatures above the critical temperatures of both sets of pole elements 20a, 20b, all the pole elements are active and form respective interpoles for the modulation of the magnetic fields produced by the inner and outer rotors 12, 16. The number of interpoles is thus equal to the sum of the number of pole pairs 14, 18, and if symmetrically placed provide a counter-rotational gearbox with a gear ratio of 3:1 (see K. Atallah, S. D. Calverley and D. Howe, *Design, analysis and realisation of a high-performance magnetic gear*, IEE Proc.-Electr. Power Appl., Vol. 151, No. 2, March 2004 for details of how magnetic gear ratios are determined).

When the gearbox 10 is operated at temperatures lower than the critical temperature of the pole elements 20a, but higher than the critical temperature of the pole elements 20b, only the pole elements 20b form interpoles for the modulation of the magnetic fields produced by the inner and outer rotors 12, 16. In the embodiment of FIG. 2, therefore, the number of active pole elements is halved, and so is the number of interpoles. The number of interpoles is now equal to the difference of the number of the pole pairs 14, 18, and if symmetrically placed provide a co-rotational gearbox with a gear ratio of 3:1. Further, the torque carrying capability of the gearbox is reduced, in line with the reduction in the number of active pole elements.

When the gearbox 10 is operated at temperatures lower than the critical temperatures of both sets of pole elements 20a, 20b, all the pole elements are deactivated. That is, no interpoles are formed for modulating the magnetic fields produced by the inner and outer rotors 12, 16. The gear arrangement is therefore no longer able to couple the motion of the inner and outer rotors 12, 16, producing a clutch-like effect.

Figure 3A:
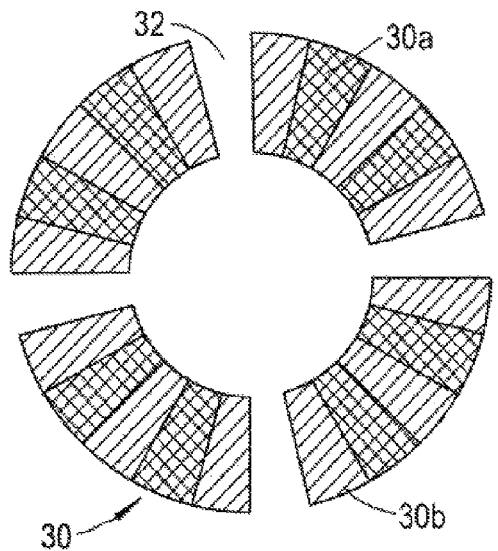
FIG. 3 shows schematically a coupling device for an epicyclic or in-line rotary gearbox in (a) a high temperature arrangement and (b) an intermediate temperature arrangement.

FIGS. 3(a) and (b) show schematically a coupling device 30 for a further epicyclic or in-line gearbox having one rotor with magnets or coils (superconducting or otherwise) producing four pole pairs and another rotor with magnets or coils producing eight pole pairs. The coupling device is required to provide 12 evenly spaced interpoles for a counter-rotating gear with a 2:1 gear ratio and four evenly spaced interpoles for a co-rotational gear with a 2:1 gear ratio, but here the higher temperature interpole arrangement is the co-rotational one.

Figure 3B:
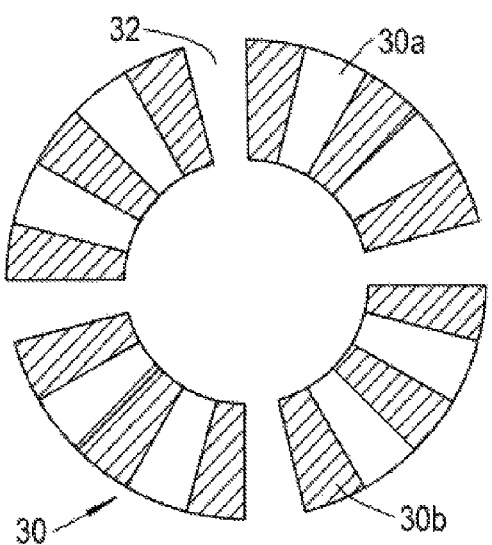

Eight pole elements 30a have a higher critical temperature for superconductivity, and 12 pole elements 30b of have a lower critical temperature for superconductivity. The pole elements are all of the same width, and are positioned in four groupings with two pole elements 30a and three pole elements 30b in each grouping. The gap 32 between each grouping has the same width as the pole elements 30a that are to be deactivated. As shown in FIG. 3(a), at temperatures above the higher critical temperature, the grouped pole elements form four equally-spaced interpoles, producing a co-rotational gear. As shown in FIG. 3(b), at temperatures between the critical temperatures, the pole elements 30a become inactive, and the remaining pole elements 30b form 12 equally-spaced interpoles producing a counter-rotational gear. At a temperature below the critical temperatures of pole elements 30a, 30b the gearbox stops transferring power from one rotor to the other.

Figure 4:
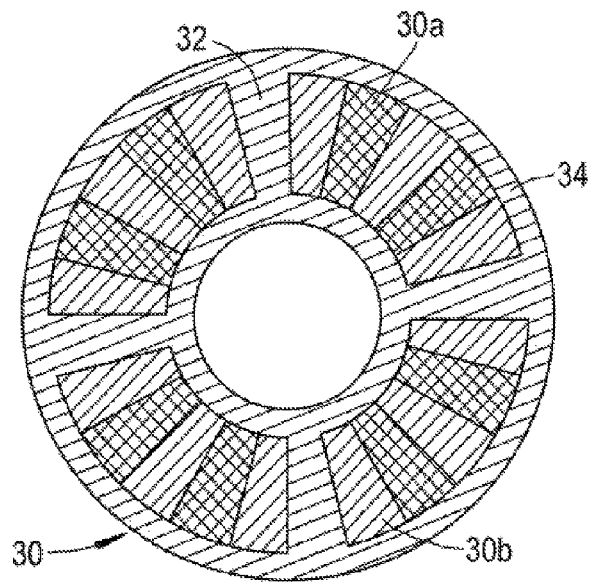
FIG. 4 shows a variant of the coupling device of FIG. 3.

To avoid magnetic flux extending through the gaps 32 rather than through the active pole elements 30a, 30b, the gaps can contain joining portions formed of material that is relatively impermeable to magnetic fields. As shown in FIG. 4, that material can be a further superconducting material 34 that has a higher critical temperature than highest critical temperature of the pole elements 30a, 30b, the gearbox normally operating at a temperature below the critical temperature of the joining portions so that magnetic field is repelled from the gaps 32 by the Meissner effect. Indeed, in FIG. 4, the pole elements 30a, 30b are encased in the further superconducting material 34. The encasing material, which can have openings to allow the magnetic field to reach the pole elements 30a, 30b from the rotors, effectively guides magnetic flux through the interpoles. There are four openings above the plane of the drawing in FIG. 4 and four openings below the plane, each opening delineating a window around a respective end of one of the groupings of pole elements 30a, 30b, the coupling device being in this case for an in-line, rather than an epicyclic, gearbox.

However, if the magnetic permeability of the coolant used to cool the coupling device is low relative to that of the pole elements 30a, 30b when above their critical temperatures, the joining portions or encasing material may not be needed, as the pole elements can be surrounded by the coolant.

A sheet of further superconducting material having a higher critical temperature than highest critical temperature of the pole elements 30a, 30b may be positioned between the in-line rotors to prevent magnetic flux from travelling directly from one rotor to the other (bypassing the interpoles).

The positioning of the rotors may be chosen to ensure that the flux paths are relatively simple i.e. with few changes in direction. For example, slots in which the rotors can run may be formed in the further superconducting material 34 encasing the pole elements 30a, 30b. Indeed, if the cylinder of further superconducting material 34 in FIG. 4 is extended beyond the rotors of the gearbox, the ends of the cylinder can be closed off around the rotors (with holes in the end walls to allow shafts to attach to the rotors) to form an enclosing housing for the gearbox. This can provide shielding (by the Meissner effect) to contain the high magnetic fields which may be formed in the gearbox, limiting the interference they may cause to other systems. This might be beneficial e.g. in submarine applications where the leakage of magnetic fields could reveal the location of the submarine.

FIGS. 2 to 4 illustrate just two possible configurations for the pole elements of the coupling device. Many other configurations are possible for different rotor configurations. For example, providing three or more sets of pole elements, each set being formed from a respective superconducting material having a different critical temperature from the other sets, can increase the number of interpole arrangements possible, allowing harmonic gears to be achieved as well as counter and co-rotating gears.

Figure 5A:
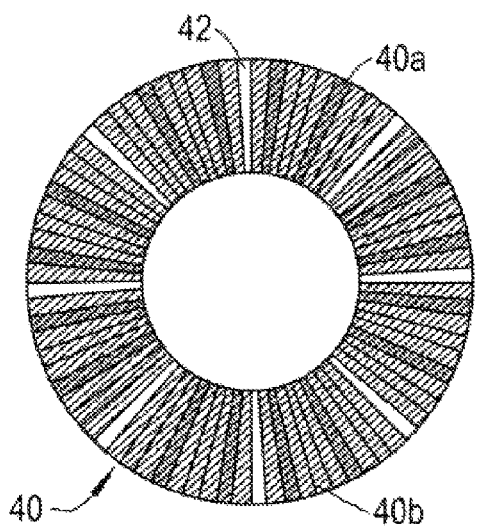
FIG. 5 shows schematically a further coupling device for an epicyclic or in-line rotary gearbox in (a) a high temperature arrangement and (b) an intermediate temperature arrangement.
Figure 5B:
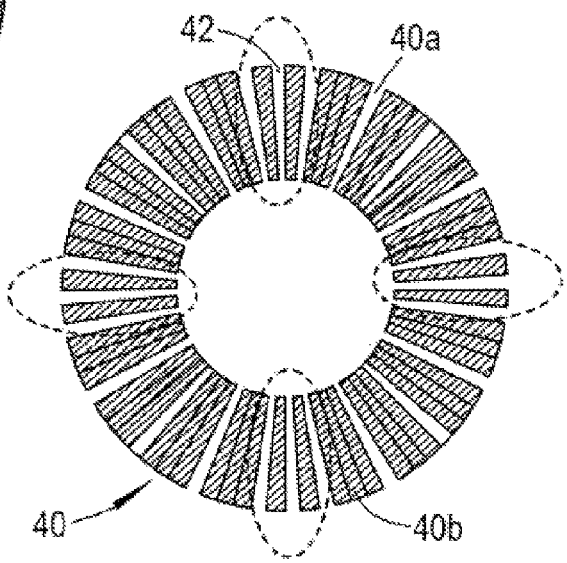

Further, in FIGS. 2 and 4, the high and intermediate temperature interpole arrangements are rotationally symmetrical. However, the deactivation of pole elements reduces the capacity of the coupling device to transmit torque in the intermediate temperature interpole arrangement. That capacity can be increased if non-rotationally symmetric interpole arrangements are adopted. FIG. 5(a) shows a coupling device 40 having 16 pole elements 40a with a higher critical temperature, and 56 pole elements 40b with a lower critical temperature. The device is for two rotors having respectively six and 14 magnetic pole pairs, and thus needs to provide 20 interpoles for a contra-rotating gear and eight interpoles for a co-rotating gear. Eight equally-spaced gaps 42, having the same width as the pole elements 40a, divide the pole elements into eight groupings, and hence provide eight equally-spaced interpoles in the high temperature arrangement. FIG. 5(b) shows the intermediate temperature arrangement, in which the 16 pole elements 40a are inactive. There are now 20 equally-spaced interpoles, as required for a contra-rotating gear, but four of those interpoles (indicated by dotted lines) are incomplete, lacking one central pole element relative to the other 16 interpoles. Nonetheless, the four incomplete interpoles, although causing a departure from an ideally symmetric interpole arrangement, do not change the coupling of the magnetic fields sufficiently to prevent the coupling device producing the contra-rotating gear.

For torque limitation applications (e.g. in precision machinery devices, or where a variable torque is required), the interpoles can be made up of two or more pole elements. At high temperatures, all the pole elements are active, giving the interpoles a large cross-sectional area, and hence a large pull out torque. To reduce the torque capability, the outer pole element(s) of each interpole are taken below their critical temperature, reducing the cross-sectional areas of the interpole, but maintaining the angular positions of the interpoles.

Figure 6:
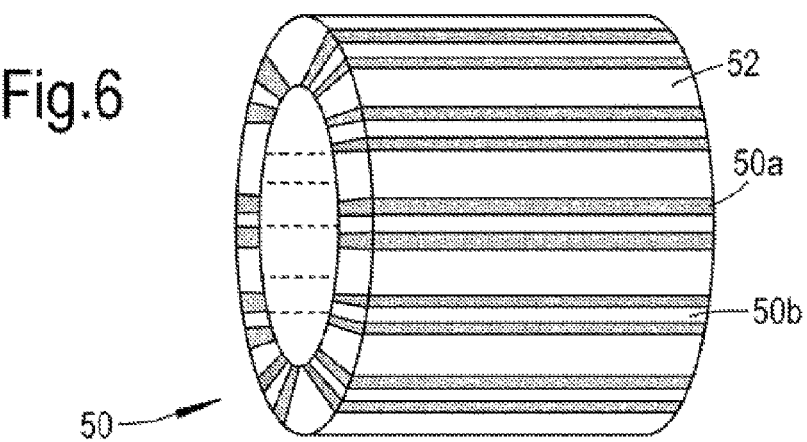
FIG. 6 shows schematically a cylindrical coupling device for an epicyclic or in-line rotary gearbox.

For mechanical strength, the coupling device for rotary gearbox applications preferably has the interpoles in the form of a hollow cylinder, as illustrated in FIG. 6 which shows schematically a coupling device 50 with interpoles formed of two types of pole element 50a and 50b (each having a different critical temperature) and joining portions formed of inactive material filling the gaps 52 between interpoles.

As well as rotary gear arrangements, the present invention can also be applied to e.g. linear gear arrangements. FIG. 7 shows schematically a linear gear arrangement 60 having a low speed member 62 and a high speed member 66. Magnetic poles 64, 68 of alternating polarity are provided by magnets or coils on the members. Between the low and high speed members is a coupling device 70 having interpoles formed of superconducting pole elements 70a. FIG. 8 shows schematically a further linear gear arrangement 80 having a low speed tubular member 82 and a coaxial high speed central shaft member 86. Magnetic poles 84, 88 of alternating polarity are provided by magnets or coils on the members. Between the low and high speed tubular members is a coaxial tubular coupling device 90 having interpoles formed of superconducting pole elements 90a.

Advantageously, the superconducting pole elements of the coupling devices described above are compatible with a superconducting magnetic field. For example, the superconducting field could be between 10 and 17T—leading to very torque-dense gearboxes.

Coupling Devices Comprising a Superconducting Body and a Plurality of Temperature Control Elements for Heating Regions of the Body A magnetic gear arrangement takes the form of an in-line gearbox having a first rotor 112 (i.e. a first gear member), a second rotor 116 (i.e. a second gear member), and a cylindrical coupling device 120. FIG. 9 shows schematically the gearbox without the coupling device in place in (a) an end-on view of the first rotor, (b) an end-on view of the second rotor, and (c) a side view. FIG. 10 shows schematically the gearbox with the coupling device in place in (a) an end-on view of the first rotor and the coupling device, (b) an end-on of the second rotor and the coupling device, and (c) a side view.

Superconducting permanent magnets fixed to the first 112 and second 114 rotors form respective pole pairs 1146 118, the opposite polarities of each magnet being respectively indicated by dark and light shading. The pole pairs 116 of the first rotor have alternating polarity along the circumference of the rotor. Similarly, the pole pairs 118 of the second rotor have alternating polarity along the circumference of that rotor. Respective drive shafts 113, 115 extend from the rotors.

The first 112 and second 114 rotors have different numbers of pole pairs 114, 118. In the embodiment of FIGS. 9 and 10, the first rotor is shown with four pole pairs, and second rotor is shown with 22 pole pairs.

The coupling device 120 is formed from a cylinder of superconducting material. Above its critical temperature, the material preferably provides a high magnetic permeability to encourage magnetic flux to extend through the material in preference to e.g. surrounding air, and also preferably has a high flux density saturation level. Below its critical temperature, the material repels magnetic fields due to the Meissner effect and thus is inactive in coupling the magnetic flux. In the gearbox, the coupling device is cooled, e.g. by a coolant, to a temperature below the critical temperature.

FIG. 11 shows schematically (a) an end view, and (b) a side view of the coupling device 120. Electrical conductors 121 extend from end to end of the cylinder, the conductors heating surrounding regions 120a of the cylinder by resistive heating. Thus respective locally heated regions are formed around the conductors. In these regions, the superconducting material is locally above its critical temperature, and thus permeable to the magnetic fields generated by the first 112 and second 116 rotors. The extent of the heated regions depends on factors such as the thermal conductivity of the superconducting material, the heat flow from the conductors, and the effectiveness of the coolant. Thermally insulating elements (not shown) may be included in the coupling device to reduce the flow of heat from the heated regions to the non-heated regions of the device. For example, the superconducting material of the device may have recesses, slots or gaps which receive sheets of thermally insulating material and which define the boundaries of the heated regions.

The current flowing through the electrical conductors 121 produces a magnetic field which could interact with the fields generated by the first 112 and second 116 rotors to produce an unwanted reaction force in the coupling device. To eliminate or reduce this effect, the conductors can be arranged, e.g. as twisted wire pairs with the current in each wire of the pair flowing in a different direction. With such an arrangement the magnetic field produced by one wire is cancelled out by the magnetic field produced by the other wire of the pair.

The electrical conductors 121 are typically electrically insulated from the surrounding superconducting material, but not thermally insulated.

Figure 1:
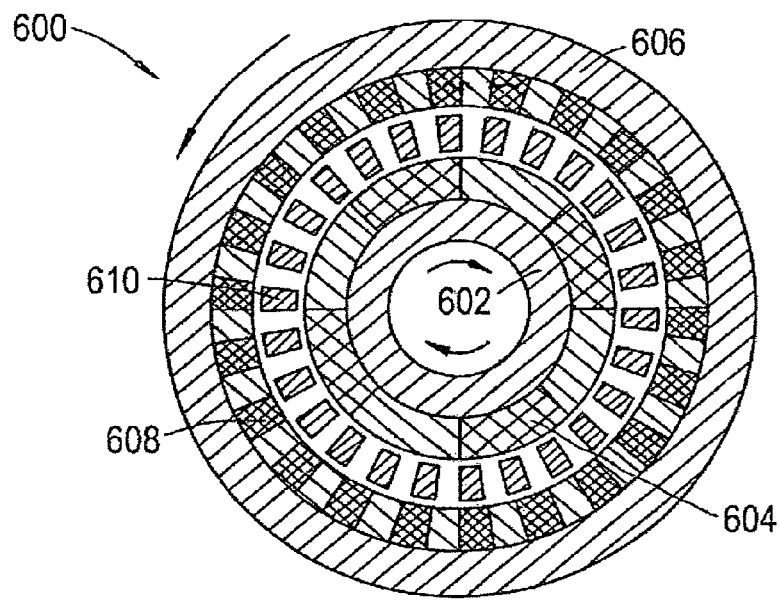
FIG. 1 shows a schematic cross-sectional view of a magnetic gear arrangement of the prior art.

The cylinder of superconducting material of the coupling device 120 is held at superconducting temperatures (i.e. below the critical temperature) by the coolant. Energising the electrical conductors 121 produces the heated regions 120a around the conductors. The heated regions, thus activated, form interpoles for coupling the first and second magnetic fields. Although formed by heating, these interpoles are analogous to the interpoles formed by the pole elements 610 of the prior art magnetic gear arrangement of FIG. 1. The number and distribution of interpoles is a factor in controlling the gearing of the gearbox.

In FIG. 11 the electrical conductors 121, and hence the heated regions 120a, extend from end to end of the cylindrical coupling device 120. However, other paths for the electrical conductors are possible. For example, the conductors could turn towards the rotors 112, 116 at the ends of the cylinder to encourage the magnetic fields generated by the rotors to enter the heated regions of the coupling device.

A sheet of further superconducting material may be positioned between the in-line rotors 112, 116 to prevent magnetic flux from travelling directly from one rotor to the other (bypassing the interpoles). The critical temperature of the separator element can be equal to or greater than the critical temperature of the coupling device 120 so that they are both in a superconducting state when they are cooled by the coolant to the same temperature below the critical temperature of the device.

If the cylindrical coupling device 120 is extended beyond the rotors 112, 116, the ends of the cylinder can be closed off around the rotors (with holes in the end walls to accommodate the drive shafts 113, 115) to form an enclosing housing for the gearbox. This can provide shielding (by the Meissner effect) to contain the high magnetic fields which may be formed in the gearbox, limiting the interference they may cause to other systems. This might be beneficial e.g. in submarine applications.

The coupling device 120 can have different numbers and arrangements of electrical conductors 121 in order to produce different shapes, sizes and arrangements of heated regions 120*a*. In particular, changing the angular positions of the interpoles formed by the heated regions allows the gearbox gear ratio and/or relative direction of rotation to be changed, depending on the number of pole pairs on each rotor. Further, varying the cross-sectional area of the heated regions allows the amount of torque that can be transmitted by the coupling device to be correspondingly varied, i.e. smaller cross-sections allow less torque to be passed from rotor to rotor. The shape of the heated region can have a filtering effect on the magnetic fields, allowing harmonics to be introduced or removed.

FIG. 12 shows schematically a cross-sectional view through a further cylindrical coupling device 130, and illustrates different arrangements of electrical conductors 131*a-e* and different modes of operation (it is unlikely that all the different conductor arrangements would be used in an one device). The areas shaded grey are heated regions 130*a* whose temperatures are held above the critical temperature of the superconducting material of the coupling device by heat flowing from the conductors. Electrical conductors shown as black circles are carrying current, and hence heating the surrounding material. Larger black circles indicate higher currents and therefore more heating. Electrical conductors shown as grey circles are not carrying current. Conductor 131*a* carries a higher current than conductor 131*b* and thus produces a correspondingly larger heated region, such that the interpole formed by the heated region has an increased torque-carrying capability. Conductors 131*c* have a central conductor carrying a relatively high current and outer conductors carrying a relatively low current to produce an approximately rectangular cross-sectioned heated region. Conductors 131*d* all carry the same current and are distributed in order to also produce an approximately rectangular cross-sectioned heated region. Conductors 131*e* are distributed in a similar way to conductors 131*d*, but only a central group of the conductors 131*e* carry current, thereby producing a smaller heated region and reducing the torque-carrying capability of the interpole formed by the heated region.

The electrical conductors 131*a-e* can be under the control of a temperature controller (not shown) which is able to switch the conductors on and off, and set the level of current to the conductors, in order to achieve different coupling effects. In general, the higher the conductor density within the coupling device 130, the greater the number of interpole arrangements that can be produced.

The conductors can be energised separately, or connected in series or parallel. They may receive an AC or DC supply. A poly-phase AC supply can be used to produce a rotating pattern of heated regions and hence of interpoles, offering a means for controlling or altering the speed of the rotors as long as the rate at which the heated regions can be activated and deactivated is compatible with the desired speed of rotation of the pattern. The rate of activation and deactivation is likely to be determined to a significant extent by the thermal properties of the superconducting material.

Figure 13:
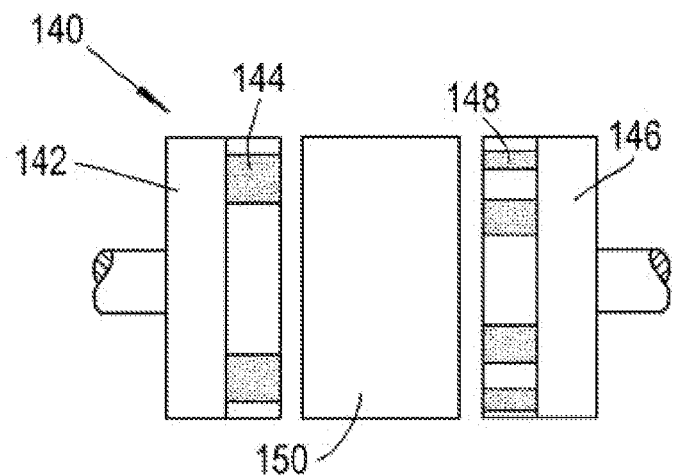
FIG. 13 shows schematically a side view of another in-line gearbox.

Many different magnetic gear arrangements are possible. FIG. 13 shows schematically a side view of an in-line gearbox 140 similar to the gearbox of FIGS. 9 and 10, but with the magnets on the end faces of the rotors 142, 146 producing respective pole pairs 144, 148, and the coupling device 150 formed as a superconducting cylinder positioned between the rotors.

Figure 14:
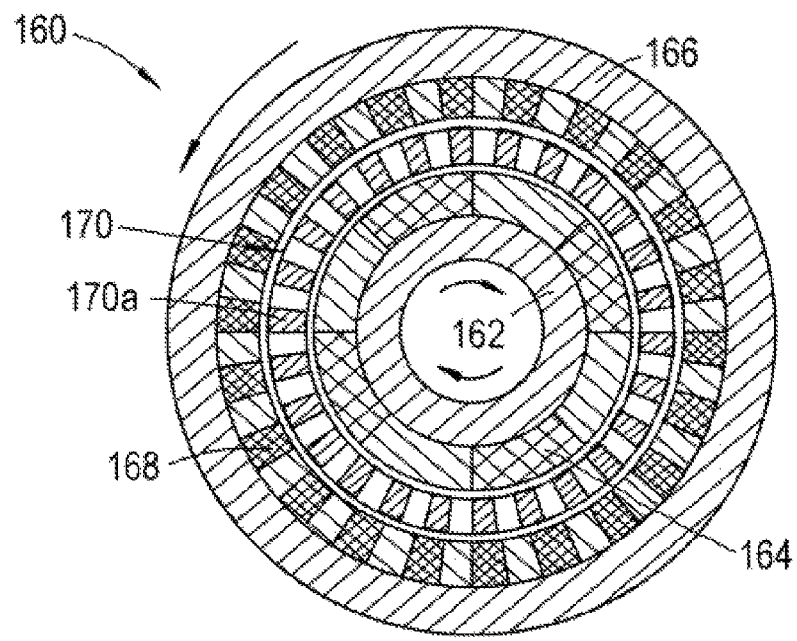
FIG. 14 shows a schematic cross-sectional view of an epicyclic magnetic gearbox.

FIG. 14 shows a schematic cross-sectional view of a magnetic gear arrangement according to another embodiment of the present invention. The magnetic gear arrangement is in the form of an epicyclic gearbox 160 and comprises an inner rotor 162 and an outer rotor 166. Superconducting permanent magnets fixed to the inner and outer rotors form respective pole pairs 164, 168. A coupling device 170 between the rotors 162, 166 has a cylindrical superconducting body, with axially extending heated regions 170*a* forming an arrangement of interpoles for coupling the magnetic fields of the rotors.

Figure 15:
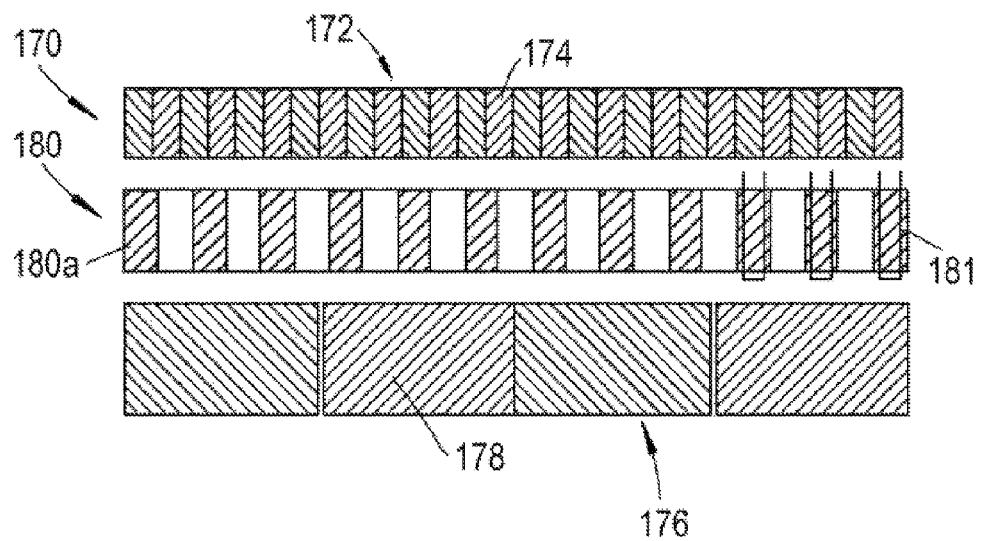
FIG. 15 shows schematically a linear gear arrangement.
Figure 16:
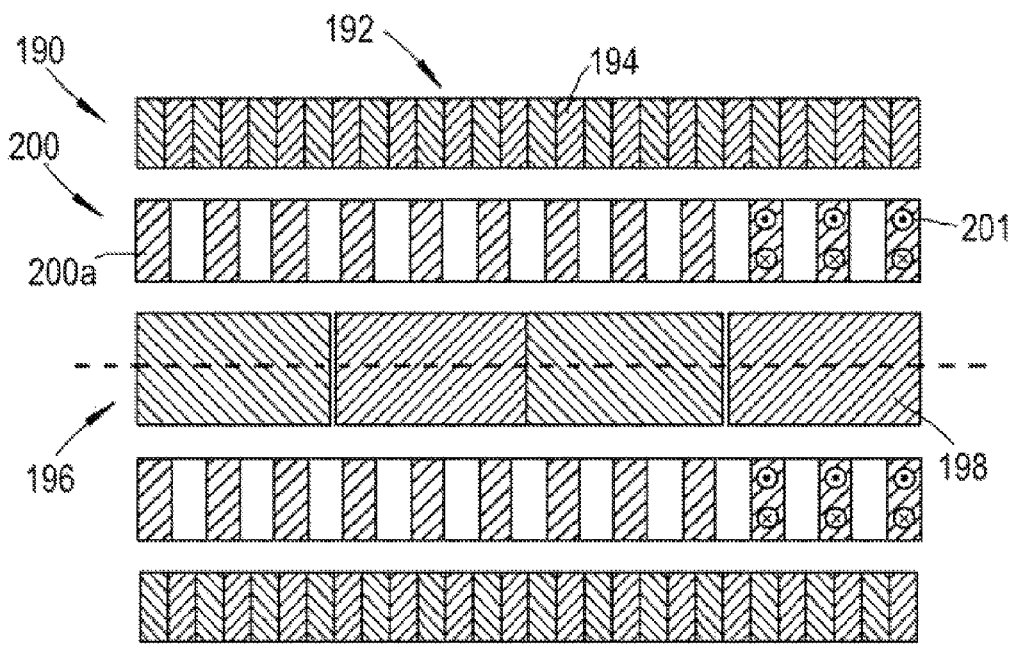
FIG. 16 shows schematically a further linear gear arrangement.

As well as rotary gear arrangements, the present invention can also be applied to e.g. linear gear arrangements. FIG. 15 shows schematically a linear gear arrangement 170 having a low speed member 172 and a high speed member 176. Magnetic poles 174, 178 of alternating polarity are provided by magnets or coils on the members. Between the low and high speed members is a coupling device 180 formed as a linearly extending body. Electrical conductors 181 embedded in the body produce heated regions 180*a* which form respective interpoles. FIG. 16 shows schematically a further linear gear arrangement 190 having a low speed tubular member 192 and a coaxial high speed central shaft member 196. Magnetic poles 194, 198 of alternating polarity are provided by magnets or coils on the members. Between the low and high speed tubular members is a coupling device 200 formed as a coaxial superconducting tube. Electrical conductors 201 embedded in the tube produce heated regions 200*a* which form respective interpoles.

Advantageously, the superconducting bodies of the coupling devices described above are compatible with a superconducting magnetic field. For example, the superconducting field could be between 10 and 17T—leading to very dense gearboxes.

Superconducting Magnets and Superconducting Coupling Device

An advantage of using superconducting magnets in a gearbox to generate magnetic fields is that manufacture and assembly of the gearbox can be performed with unmagnetised materials which are then magnetised in situ. In this way, the difficulties and hazards of manipulating magnetised materials in the presence of very strong magnetic forces can be avoided. Although permanent magnet gearboxes could in principle be manufactured and assembled from unmagnetised permanent magnet materials which are then magnetised in situ, this would require large and heavy windings in the magnetic gearbox to carry the electric currents and substantial electrical power supplies to supply those currents. By contrast, superconducting magnets can be magnetised using magnetic flux pumping, which can be performed using significantly smaller and lighter windings and reduced electrical power supplies.

A gearbox having gear members which use superconducting magnets or coils to generate the magnetic field can also be lighter than permanent magnet based gearboxes. For example, some superconductors, such as magnesium diboride, have a density which is nearly a third of that of ferromagnetic materials, such as electrical steels, and of permanent magnets, such as samarium cobalt or neodymium boron iron.

Ferromagnetic materials, such as electrical steels, and permanent magnets, such as samarium cobalt and neodymium boron iron, are also limited to flux densities of no more than about 2 T, whereas superconductors can support magnetic fields of well above 10 T, providing significant improvements in power (e.g. over 25-fold increases).

Figure 17:
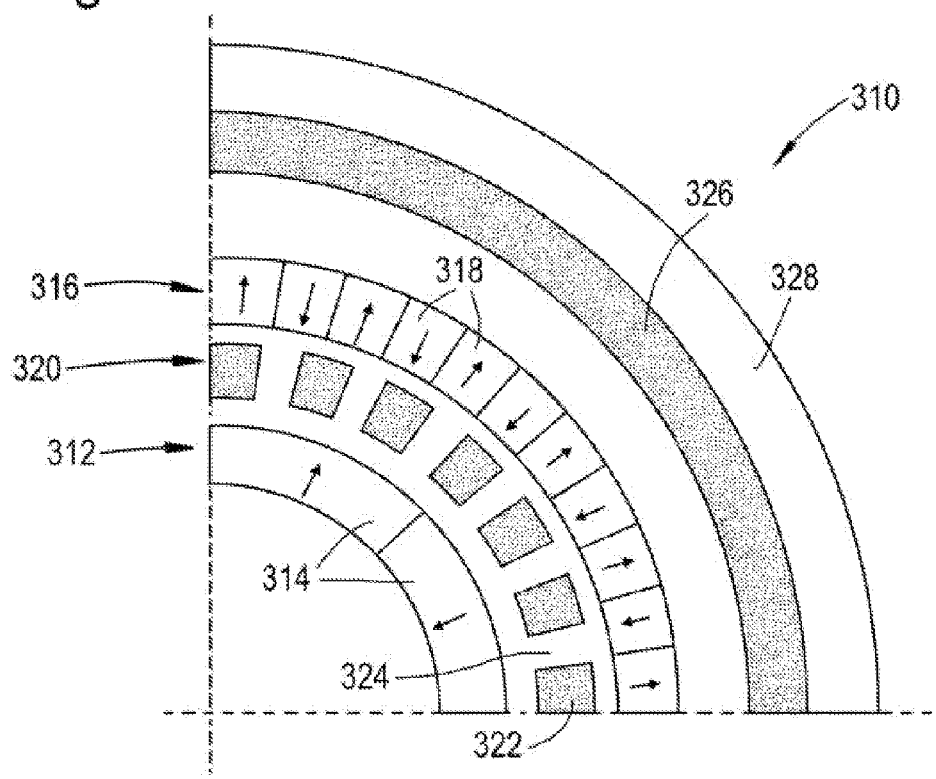
FIG. 17 shows a quarter of a schematic cross-sectional view of a magnetic gear arrangement according another embodiment of the present invention.

FIG. 17 shows a quarter of a schematic cross-sectional view of a magnetic gear arrangement according to the present invention. The magnetic gear arrangement is in the form of an epicyclic gearbox 310 and comprises an inner rotor 312 (i.e. a first gear member) and an outer rotor 316 (i.e. a second gear member). Superconducting magnets fixed to the inner and outer rotors provide respective pole pairs 314, 318, the opposite polarities of each magnet being respectively indicated by arrows in opposing directions.

A coupling device 320 formed of a slotted superconducting cylinder is interposed between the inner 312 and outer 316 rotors. Bars 322 of superconducting material separate a plurality of circumferentially spaced slots 324. The bars repel magnetic flux produced by the inner and outer rotors by the Meissner effect. This forces the flux to pass through the slots, which thus form interpoles that modulate the magnetic fields produced by the inner and outer rotors, so as to couple the two fields and hence couple the motion of the rotors. The number and distribution of interpoles is a factor in determining the gearing of the gearbox.

A superconducting shield 326 supported on support housing 328 surrounds the gearbox. The shield helps to prevent the magnetic fields from leaking out of the gearbox, which not only improves the performance of the gearbox but also avoids the magnetic fields produced by the gearbox causing electromagnetic interference. The shield may be mechanically coupled to the outer rotor 316, such that the shield rotates with the rotor. For example, electrically insulating material (not shown) may bridge the gap between the shield and the outer rotor.

Advantageously, the supporting housing 328 can contain or otherwise form part of a thermal insulation system to keep the superconducting materials below the temperature required for superconductivity. For example, the housing can contain ducts or other formations for circulating cooling fluid.

Figure 18:
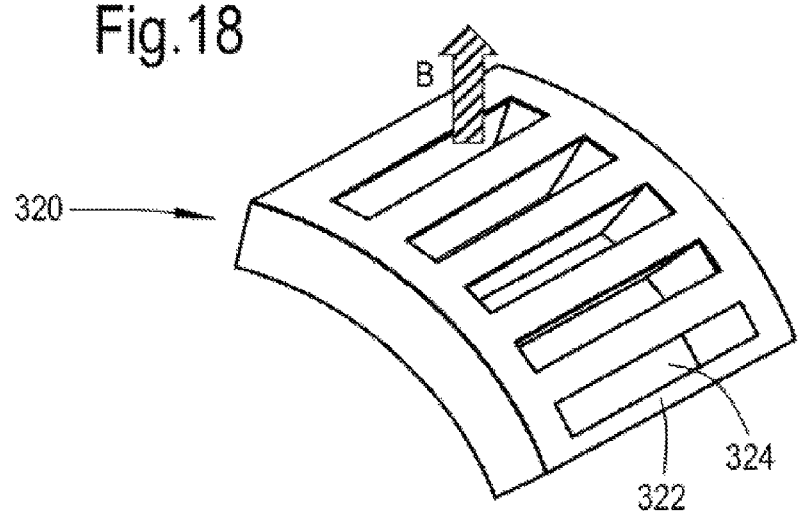
FIG. 18 shows schematically a segment of a superconducting cylinder coupling device of the magnetic gear arrangement of FIG. 17.

FIG. 18 shows schematically a segment of the coupling device 320. Typically, the slots 324 in the superconducting cylinder are equally spaced around the circumference to form a pattern of bars 322 and slots 324. As the magnetic flux B can pass through the slots but avoids the bars, the periodic pattern of slots and bars produces a periodic variation of magnetic reluctance around the circumference of the interpole cylinder. This modulates the magnetic field passing between the two rotors 312, 316. Relative to the coupling devices described above in relation to FIGS. 2 to 16, the coupling device 320 differs in not having means to change the number and distribution of interpoles. Thus the gearing between the rotors in this case is fixed.

FIG. 19 illustrates schematically poles 314, 318 of the inner 312 and outer 316 rotors and also the coupling device 320, and shows how magnetised regions on the inner and outer rotors align with the slots 324. The slots may be skewed at an angle away from the axial direction of the rotors and superconducting cylinder in order to produce various electromagnetic effects, for example the elimination of unwanted harmonic magnetic fluxes.

The slots 324 may be filled with solid material to improve the mechanical strength. Electrical insulating materials can be located in the slots to avoid eddy current and magnetic hysterisis losses. Alternatively or additionally, magnetic materials such as electrical steels could be used. Any electrical conductor located in the slots should preferably be laminated to reduce eddy current losses. Instead of the rectangular slots shown in FIGS. 18 and 19, other shapes of slots are possible. The corners of the slots may be rounded to reduce mechanical stresses.

Turning to the superconducting magnets fixed to the inner 312 and outer 314 rotors, these can be magnetised by flux pumping to produce a pattern of magnetic polarity that varies as a function of angle around the circumference. Electrically insulating barriers may be provided to separate regions of one magnetic polarity from regions of the opposite polarity. These barriers may be formed of solid insulation or may be slots machined or otherwise formed in the superconducting material.

Typically, during flux pumping, small pulses of magnetic field are applied repeatedly to magnetise a superconductor. This produces a "super-current", which is a superconducting current that flows in the superconducting material. The super-current maintains the magnetisation of the superconductor even when the flux pumping ceases. The superconductor's magnetic field and super-current can persist for many years provided cryogenic conditions are maintained, typically by a refrigerating system (not shown). However, the magnetic field and super-current have a tendency to decay due to various losses, and so the flux pumping may be repeated from time to time to replenish the magnetic field.

Any convenient flux pumping technique can be used to magnetise the superconducting magnets fixed to the inner 312 and outer 314 rotors. For example, an electrical method uses an electrical winding 330 around the superconducting magnet 332, as shown schematically in FIG. 20. Successive pulses of electric current are applied to the winding in order to magnetise the superconductor. The winding is shown in FIG. 20 as a single turn coil, although other winding arrangements are possible, particularly multi-turn windings. The electrical supply for flux pumping may be a DC supply with positive and negative polarities, as shown, although other polarities are possible. Typically the electrical supply also comprises switches, transformers and semi-conductors e.g. to provide the flux pumping current at an appropriate frequency and waveform.

The electrical winding 330 may be located in one or more slots or grooves aound the circumference of the superconducting magnet 332. As rotation of the respective rotor moves the winding, the rotor is rotated until electrical contacts 334 on the winding make contact with the electrical contacts on the electrical supply 336. The superconductor and the winding are kept stationary while the flux pumping is carried out. When the flux pumping is complete, the magnetised superconductor is moved away and the electrical connection is disconnected. Another superconducting magnet with a similar winding may then be moved into position for flux pumping. However, if it is necessary to perform flux pumping while the rotor is rotating, the electrical supply to the moving windings may be made via sliding contacts, such as electrical brushes, slip-rings and commutators.

Figure 21:
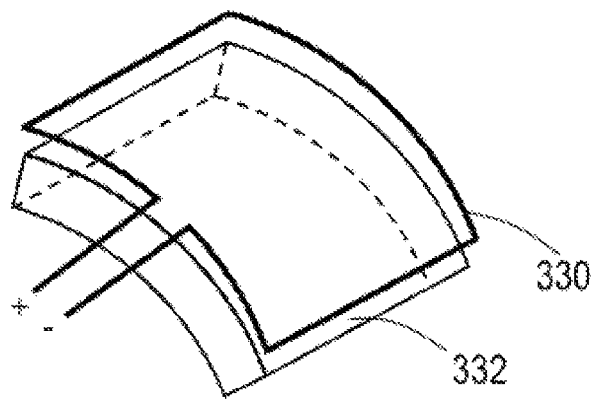
FIG. 21 shows schematically a flux pumping winding located in an air gap between a superconducting magnet of a rotor of the magnetic gear arrangement of FIG. 17 and the superconducting cylinder coupling device.

Alternatively, one or more windings may be provided in an air-gap between the respective rotor 312, 316 and the coupling device 312, as shown schematically in FIG. 21 (the coupling device not being shown). With this arrangement the windings 330 can be stationary, which simplifies the electrical supply to the windings, and also simplifies the construction of the windings as they do not have to withstand centrifugal forces during operation. To perform flux pumping on a particular superconducting magnet 332, the rotor is rotated so that the superconductor is moved into alignment with the winding.

Figure 22A:
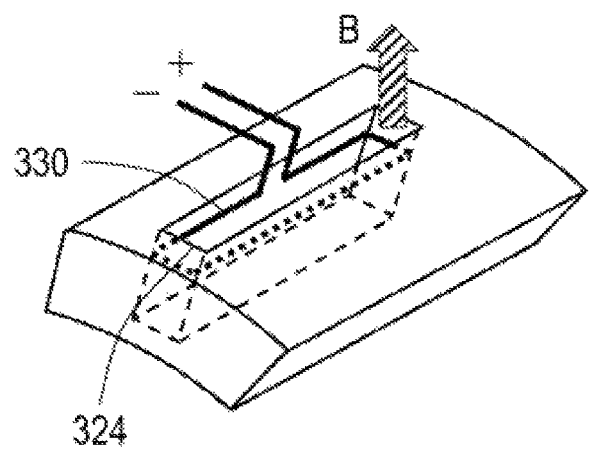
FIG. 22 shows schematically (a) a flux pumping winding located in a slot of the superconducting cylinder coupling device, and (b) alignment of superconducting magnets on the rotors with the slot.
Figure 22B:
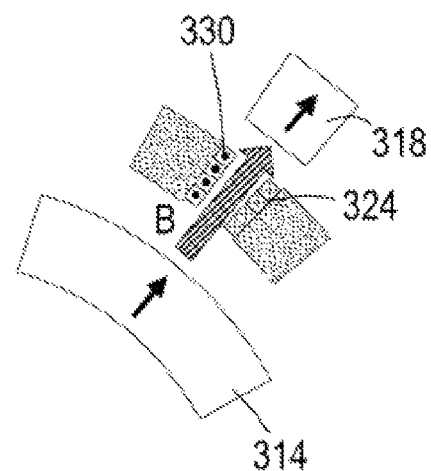

Flux pumping windings can also be installed on the coupling device 312. One possible location is in the slots 324, as shown schematically in FIG. 22(a) and (b). FIG. 22(a) shows for simplicity only a single turn, but many turns may be used, as shown in FIG. 22(b). An advantage of locating the winding 330 in one of the slots is that the magnetic field pulse B from the winding can simultaneously magnetise superconducting magnets 314, 318 of the inner and outer rotors.

Figure 23A:
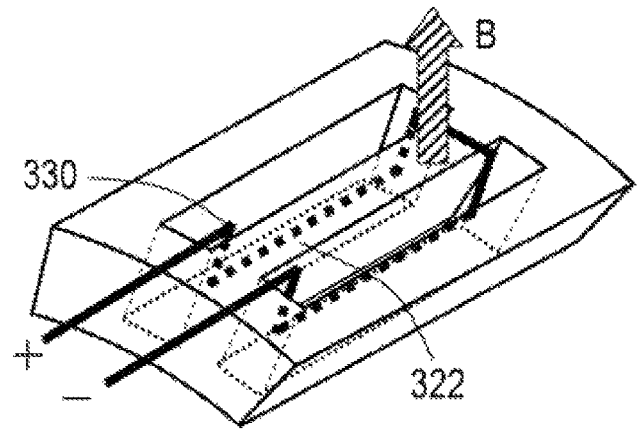
FIG. 23 shows schematically (a) a flux pumping winding located on a bar of the superconducting cylinder coupling device, and (b) alignment of superconducting magnets on the rotors with the bar.
Figure 23B:
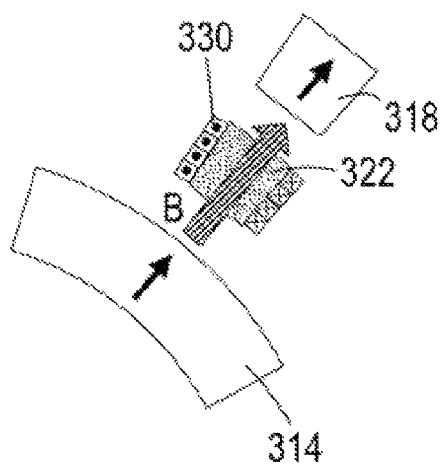

In another arrangement, a flux pumping winding 330 can be mounted as a "saddle winding" over one of the bars 322 of the coupling device 312, as shown schematically in FIGS. 23(a) and (b). In order for the magnetising field B to pass through the bar, the superconducting material of the bar is quenched, that is, becomes non-superconducting, by raising it above its critical temperature. This heating can conveniently be performed by the winding itself. When the flux pumping current is switched off, the bar can cool and re-establish its superconductivity.

Flux pumping can also be performed using the same electrical conductors 121, 131a-e (see FIGS. 11 and 12) that are used to heat regions of the coupling devices 120, 130. If this method is used, regions of the coupling devices 120, 130, close to the electrical conductors 121, 131a-e would have to be heated above their critical temperatures so that those regions become non superconducting in order to allow effective flux pumping.

Magnetic flux pumping may produce unwanted magnetisation of the various parts of the superconducting cylinder of the coupling device 312, and in particular the bars 322. However, unwanted magnetisation can be removed by periodically heating the superconducting cylinder above its critical temperature so that it ceases to superconduct. The heating may be accomplished by one or more of the following approaches:

(i) Dedicated electric heating elements,
(ii) Using the magnetic flux pumping windings as electric heaters, and
(ii) Using a superconducting cylinder of the coupling device 320 which has a higher critical temperature than that of the superconducting magnets of the rotors 312, 316, and then controlling the temperature to a level between the critical temperatures so that the superconducting magnets remain superconducting but the superconducting cylinder becomes non-superconducting.

Another option for removing unwanted magnetisation is to flux pump in reverse.

As well as epicyclic rotary gear arrangements, the present invention can also be applied to e.g. other rotary gear arrangements (e.g. rotary in-line, coaxial rotary shafts) and linear gear arrangements.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A magnetic gear arrangement comprising:
   a first gear member having a first number of pole pairs for generating a first magnetic field,
   a second gear member having a second number of pole pairs for generating a second magnetic field, the first and the second number of pole pairs are different, and
   a coupling device which provides an arrangement of interpoles between the first gear member and the second gear member, the interpoles simultaneously coupling and modulating the magnetic fields of the pole pairs of the first and second gear members to produce a gear ratio between the first and second gear members;
   wherein the first gear member has superconducting magnets or coils for generating the first magnetic field and/or the second gear member has superconducting magnets or coils for generating the second magnetic field and,
   wherein the coupling device comprises superconducting material which defines regions in the interpole arrangement.

2. A magnetic gear arrangement according to claim 1, further comprising electrical windings for flux pumping the superconducting magnets or coils.

3. A magnetic gear arrangement according to claim 1, wherein the electrical windings are located on the coupling device.

4. A magnetic gear arrangement comprising:
   a first gear member having a first number of pole pairs for generating a first magnetic field,
   a second gear member having a second number of pole pairs for generating a second magnetic field, the first and the second number of pole pairs are different, and
   a coupling device which provides an arrangement of interpoles between the first gear member and the second gear member, the interpoles simultaneously coupling the magnetic fields of the pole pairs of the first and second gear members to produce a gear ratio between the first and second gear members;
   wherein the coupling device comprises superconducting material which defines regions in the interpole arrangement.

5. A magnetic gear arrangement according to claim 3, wherein the coupling device comprises a superconducting body having a plurality of spaced openings therein, the openings forming the interpoles, and the superconducting material providing regions between neighbouring interpoles which regions are relatively impermeable to the first and second magnetic fields.

6. A magnetic gear arrangement according to claim 3, wherein the coupling device provides arrangements of interpoles between the first gear member and the second gear member, the interpoles coupling the first and second magnetic fields such that different arrangements of interpoles produce different gearings between the first and second gear members; and
   wherein the coupling device comprises a plurality of superconducting pole elements which at least partly form the interpoles, each pole element having a critical temperature whereby the pole element is active in a respective interpole above its critical temperature and inactive below its critical temperature.

7. A magnetic gear arrangement according to claim 6, wherein deactivating at least a portion of the pole elements provides a different arrangement of interpoles.

8. A magnetic gear arrangement according to claim 6, wherein a first portion of the pole elements has a first critical temperature, and another portion of the pole elements has a lower, second critical temperature.

9. A magnetic gear arrangement according to claim 6, wherein the coupling device further comprises joining portions which join together neighbouring pole elements, the joining portions being formed of a superconducting material having a higher critical temperature than the highest critical temperature of the pole elements.

10. A magnetic gear arrangement according to claim 6, further comprising a temperature controller for controlling the temperature of at least some of the superconducting pole elements such that, under the control of the temperature controller, the temperatures of pole elements can cross their respective critical temperatures and thereby change from active to inactive or the reverse.

11. A magnetic gear arrangement according to claim 3, wherein the coupling device provides arrangements of interpoles between the first gear member and the second gear member, the interpoles coupling the first and second magnetic fields such that different arrangements of interpoles produce different gearings between the first and second gear members; and
    wherein the coupling device comprises a superconducting body having a critical temperature and further comprises a plurality of temperature control elements for heating respective regions of the superconducting body, such that when heated above the critical temperature each region becomes active to at least partly form a respective interpole, and when cooled below the critical temperature each region becomes inactive.

12. A magnetic gear arrangement according to claim 11, wherein activating different arrangements of regions provides different arrangements of interpoles.

13. A magnetic gear arrangement according to claim 11, further comprising a temperature controller for controlling the temperature of at least some of the heated regions such that, under the control of the temperature controller, the temperatures of heated regions can cross their respective critical temperatures and thereby change from active to inactive or the reverse.

14. A method of operating a magnetic gear arrangement, the method comprising:
    providing a magnetic gear arrangement according to claim 6; and
    controlling the temperature of at least some of the pole elements such that the temperatures of pole elements cross their respective critical temperatures, and thereby change from active to inactive or the reverse.

15. A method of operating a magnetic gear arrangement, the method comprising:
    providing a magnetic gear arrangement according to claim 11; and
    controlling the temperature of at least some of the heated regions such that the temperatures of heated regions cross their respective critical temperatures, and thereby change from active to inactive or the reverse.

* * * * *